Aug. 14, 1923.
M. R. RAWSON
MATCH BLOCK SAWING MACHINE
Filed June 7, 1921     2 Sheets-Sheet 1
1,464,727
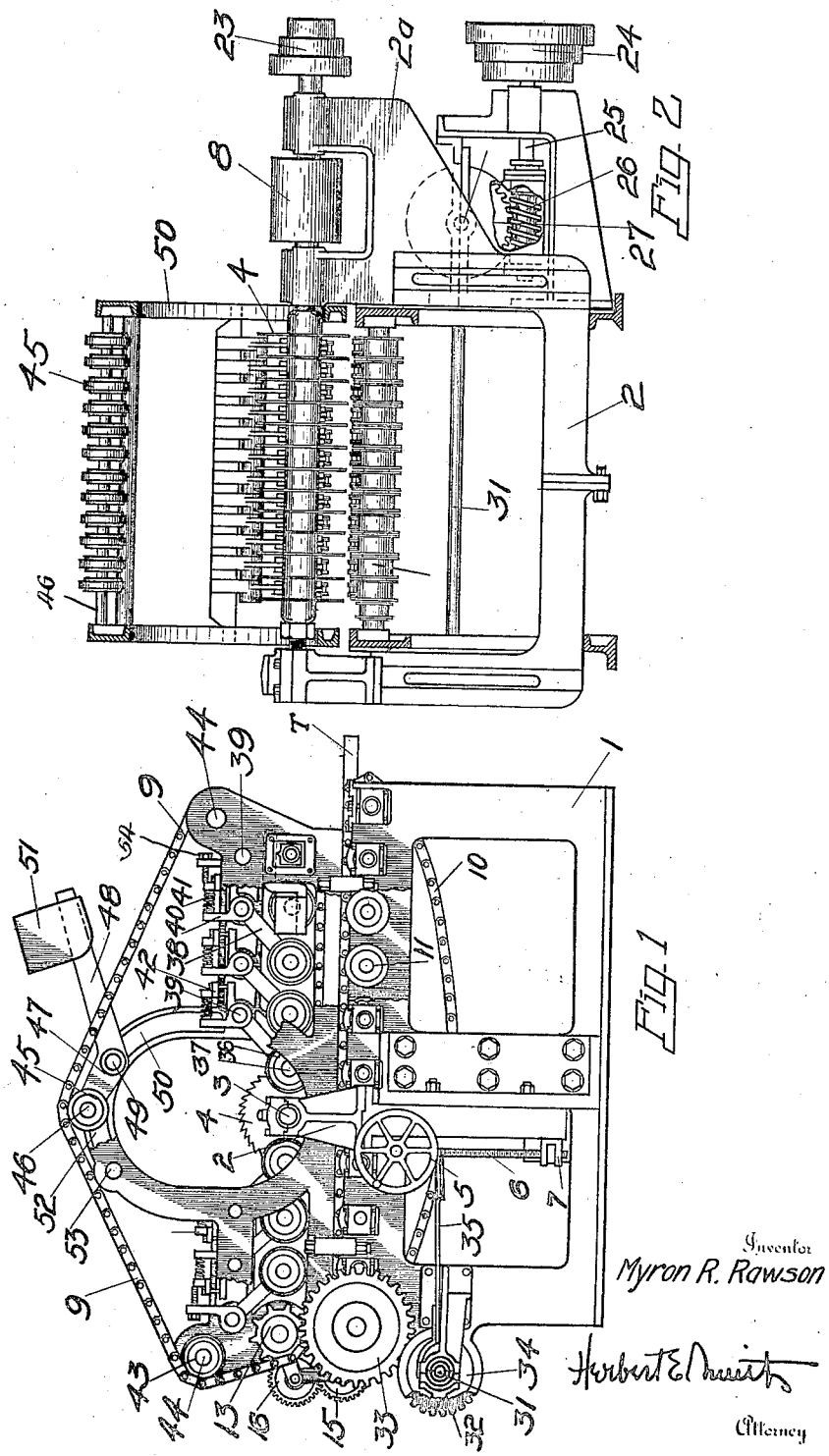
Inventor
Myron R. Rawson
Attorney Aug. 14, 1923.
M. R. RAWSON
1,464,727
MATCH BLOCK SAWING MACHINE
Filed June 7, 1921        2 Sheets-Sheet 2
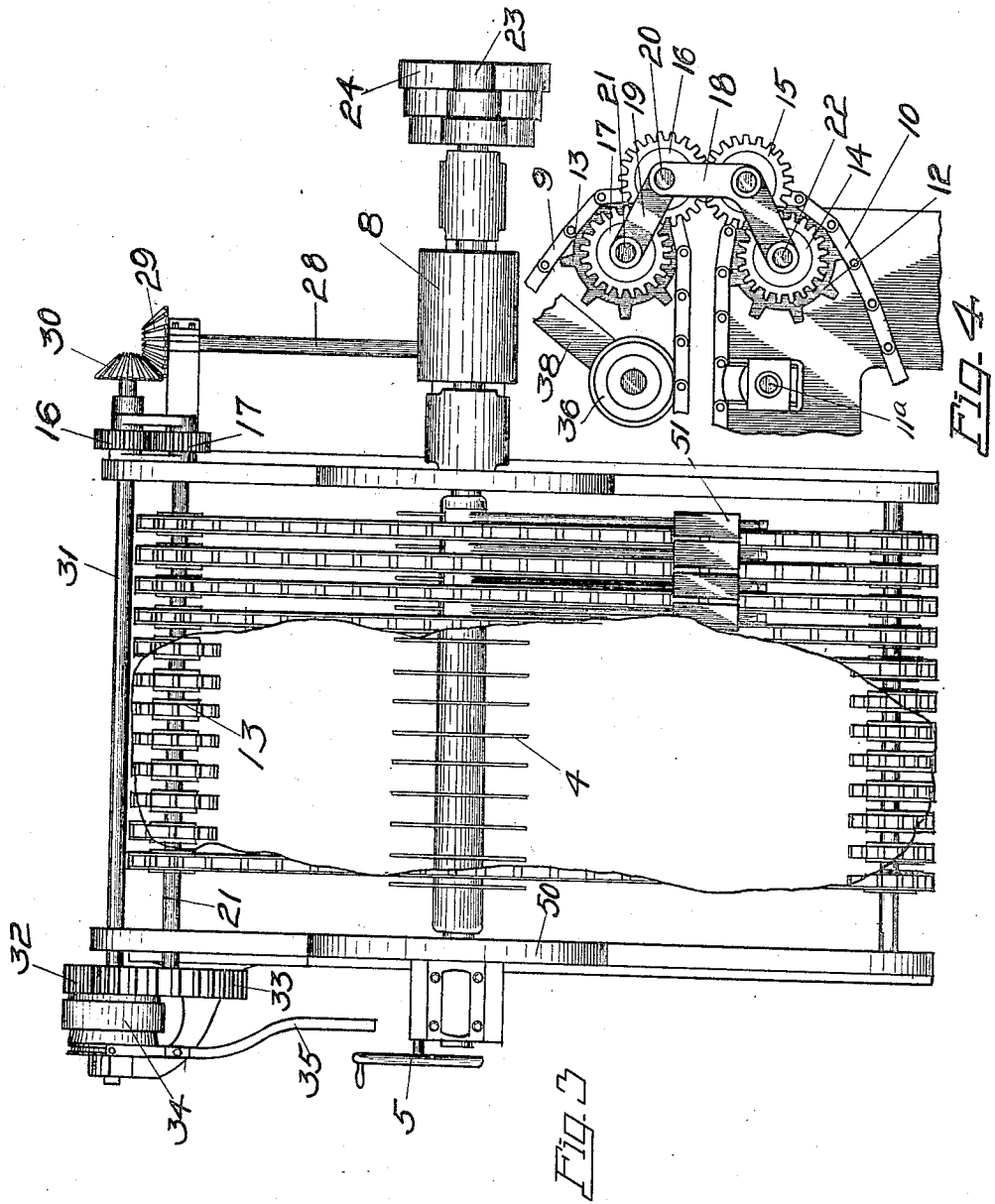
Inventor
Myron R. Rawson
By Herbert E. Smith
Attorney Patented Aug. 14, 1923.

1,464,727

UNITED STATES PATENT OFFICE.

MYRON R. RAWSON, OF SPOKANE, WASHINGTON, ASSIGNOR TO JOHN H. BOLIN, OF SANDPOINT, IDAHO.

MATCH-BLOCK SAWING MACHINE.

Application filed June 7, 1921. Serial No. 475,811.

*To all whom it may concern:*

Be it known that I, MYRON R. RAWSON, a citizen of the United States, residing at Spokane, Spokane County, and State of Washington, have invented certain new and useful Improvements in Match-Block Sawing Machines, of which the following is a specification.

My present invention relates to improvements in match block sawing machines of the gang saw type involving chain feeds for the blocks.

The primary object of the invention is the provision of a chain feed for the work whereby the plank or work may be presented to the saws in proper position to insure that the grain of the finished block will be at right angles to the cut of the saws. In the sawing of match blocks I utilize a plank approximately four feet long, and of any width to provide cut blocks the length of the completed match, and from two to two and three eighths inches in thickness. The planks are presented to the machine broadside, and it is essential to high grade work that the plank be presented to the saws in order that the latter may cut on lines at right angles to the grain of the wood. In some instances the grain of the wood does not run exactly in line with the longitudinal axis of the plank, or at right angles to the saw cut. To provide for this contingency I have combined and arranged the chain feed mechanism in order that such a plank may be held and fed to the saws at the required angle so that the cut will be perpendicular to the grain of the wood regardless of the position of the plank with relation to the saw arbor. By the utilization of a duplex chain feed involving an upper and lower complementary series of parallel feed chains, the plank may be gripped by pressure or friction, fed to the saws, and after the blocks have been severed, the segregated blocks are yet gripped by the duplex chains, and prevented from kicking back after the cut has been made. In the duplex feed chains provision is made for adapting the feed mechanism to variations in thickness of the plank by resiliently supported pressure devices for the upper series of chains, in order that the plank may be properly gripped regardless of the thickness of the plank.

The invention consists in certain novel combinations and arrangements of parts for accomplishing the above purposes as will be hereinafter more specifically pointed out and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a saw machine of the rotary, gang, type embodying the invention.

Figure 2 is a vertical sectional view of the machine, showing particularly the gang saw arbor, yoke therefor and power applying mechanisms and connections for the duplex chain feed.

Figure 3 is an enlarged, top plan view, showing some of the upper, resilient, feed chains broken away, and also showing the transmission mechanism for the upper series of chains at the upper right hand corner and the transmission mechanism and clutch of the lower feed chains at the upper left hand corner of the figure.

Figure 4 is an enlarged detail view showing the transmission mechanism between the driving parts of the chains of the duplex chain feed.

In the preferred form of the invention as illustrated in the drawings the operating parts of the machine are supported upon the main metallic frame 1, preferably composed of channel beams as shown, and adjustably mounted on this frame is the saw yoke 2, extending transversely of the main frame, which yoke, at its upper end supports the saw arbor 3 carrying the series of spaced rotary saws 4. The saw blades are located above the work, and the yoke carrying the arbor and its saws is vertically adjustable through the manipulation of the hand wheel 5 and screw bar 6, the latter provided with bearing brackets 7 for the purpose.

At one end of the yoke an extension 2ª is provided for the saw arbor, and the driving pulley 8 on the arbor receives power by belt from a suitable source as the prime mover for the operating parts of the machine.

The duplex chain feed mechanism involves an upper series 9 and a lower series 10 of chains or flexible belts, arranged in complementary pairs and located in vertical planes between adjoining saw blades 4, and these chains are designed to frictionally engage the plank or board and feed the latter from the feed table T toward the saws, and retain their pressure on the blocks after they have been severed by the saws.

The upper or working flight of the lower belts is supported in approximately horizontal position by successive series of flanged rollers 11, axially alined on their respective shafts 11ª (Figure 4) which shafts are suitably journaled in the main frame 1. At their ends the friction chains of the lower set are supported on sprocket wheels 12, while the upper chains are supported on end sprocket wheels 13, arranged in such relation that the upper and lower sets of belts have their lower and upper flights respectively, traveling synchronously in the same direction i. e. to the left in Figure 1.

In Figure 4 it will be seen that the upper and lower chain-feeds are operatively connected by a train of gears 14, 15, 16 and 17 supported in a flexible frame comprising bracket arms 18 and 19, the latter pivoted to the former at 20, and the upper drive shaft 21 for the sprockets 13 is journaled in the bracket arms 19. The lower drive shaft or sprocket shaft 22 for the sprockets 12 has stationary journals in the main frame 1 of the machine. The feed chains, through their driving sprockets 12 and 13 are driven from the saw arbor from cone pulleys 23, which may be connected by a suitable belt, not shown, with the lower complementary cone pulleys 24 fixed on the lower shaft 25 which projects laterally from the machine frame and is journaled therein. The short shaft 25 is utilized as a worm shaft, and is provided with a worm 26 meshing with a worm wheel 27 disposed longitudinally of the machine at one side thereof, as seen in Figure 2. The worm shaft, through the longitudinal shaft 28, transmits power through the bevel gears 29 and 30 to the clutch shaft 31 extending transversely at the rear of the machine. At the end of the clutch shaft opposite its bevel gear 30, a gear 32 is fixed which meshes with a larger gear 33 on the lower sprocket shaft 22 for the sprocket wheels 12. Through these connections the lower series of feed chains is actuated, and the upper series is operated from the shaft 22 by the flexibly supported train of gears 14, 15, 16, 17, as shown in Figure 4.

A clutch device 34 on the clutch shaft 31 may be engaged or disengaged by manipulation of the clutch lever 35 to control the machine, as indicated at the upper left hand corner of Figure 3, and the lower left hand corner of Figure 1, of the machine.

The planks are fed to the machine from the feed table T at the right in figure 1 with the grain of the planks parallel with the saw arbors and the planks are frictionally gripped between the lower flights of the upper chains and the upper flights of the lower chains and carried, successively, to the saw gang. The upper flights of the lower chains, which are supported on idle rollers 11, afford a stable support for the plank and for the blocks after they have been cut, and the lower flights of the upper chains are utilized as pressure members to frictionally engage the tops of the planks and blocks and hold them in proper position on the supporting lower chains, to carry the former to the saws and carry the latter from the saws, after the cutting operation.

These lower flights of the upper chains are depressed by resilient means comprising successive series of rollers 36 which are alined axially on the transversely disposed, spaced shafts 37, and these shafts are journaled in bracket arms 38 that are pivoted at their upper ends on cross bars or rods 39, extending transversely of the frame and supported therein.

Each hanger 38 is provided with a rocker arm 40 against which a spring 41 exerts its tension, the spring being attached at one end to an anchoring bar 42, and the tendency of the springs is to urge the hangers to swing the rollers thereon downwardly against the upper face of the working flights of the upper chains, and hold these flights in frictional contact with the plank and blocks cut therefrom. It will be noted that hangers for the four sets of rollers 36 at the front of the machine are inclined in a direction opposite to that of the hangers at the rear side of the saws, in order to conserve space, but in all instances the rollers exert a resilient pressure on the top surfaces of the planks and the feed chains are thus adapted to engage various thicknesses of planks within the range heretofore noted.

The upper feed chains are passed around guide pulleys 43 on shafts 44 extending transversely of the machine at the front and rear of the frame, and a set of intermediate guide rollers 45 are provided for the upper flights of the upper chains, these rollers being journaled on the roller shaft 46.

In order to take up slack and yet maintain the upper chains in the required taut condition for operation, the roller shaft 46 is provided with floating bearings in the short arms 47 of a set of bell crank levers 48. These levers are pivoted at 49 in a fixed yoke 50 above the main frame, and the long arms of the levers are each provided an adjustable counterweight 51. The shaft 46 is restrained or retarded in its movement through the instrumentality of restraining links 52 pivoted on the shaft at one end and at the other end pivoted on a cross rod 53 in the fixed yoke 50. Thus it will be apparent that the rollers 45 form a floating support for the upper flights of the upper chains and movement of the lower flights due to the resiliency of the depressing rollers 36 is compensated for by the weighted levers and connections acting on the upper flights of the upper chains.

It will be apparent that numerous changes and alterations may be made in the machine as described within the scope of my appended claims, and details of construction may be elaborated, or accessories such as adjusting bolts 54 for increasing or decreasing the tension of the springs 41 utilized without departing from the spirit of my invention.

The duplex chain feed is capable of gripping the plank, which usually is disposed parallel with the axis of the saw arbor, on both the upper and lower surfaces thereof, and when the grain of the wood does not run parallel with the axis of the saw arbor as is the case in many instances, the plank may be gripped between the duplex feed chains and held at the proper angle to present the grain of the wood at right angles to the saw blades, thus cutting the blocks at right angles to the grain as required.

Having thus fully described my invention, what I claim as new and desire to secure by Letters Patent is—

1. The combination in a sawing machine with a gang saw, of a duplex chain feed adapted to grip its work and comprising a lower series of spaced chains extending to the front and rear of the gang saw, supporting means for the upper flight of said chains, a complementary upper series of chains extending from front to rear of the machine, said upper series and lower series passing between gang saws, and resilient means bearing on the lower flight of the upper series of chains for holding the latter chains in operative relation to the lower chains.

2. The combination in a duplex chain feed with a lower series of spaced chains, of a complementary series of upper chains and stationary end supports therefor, a plurality of rollers bearing on the working flight of the upper chains, resiliently supported hangers for said rollers, and means for adjusting the resiliency of said hangers, for applying a variable pressure on the lower flight of the upper chains.

In testimony whereof I affix my signature.

MYRON R. RAWSON.